G. B. CANADA.
HARROW.
APPLICATION FILED JULY 15, 1909.
965,686.
Patented July 26, 1910.
2 SHEETS—SHEET 2.
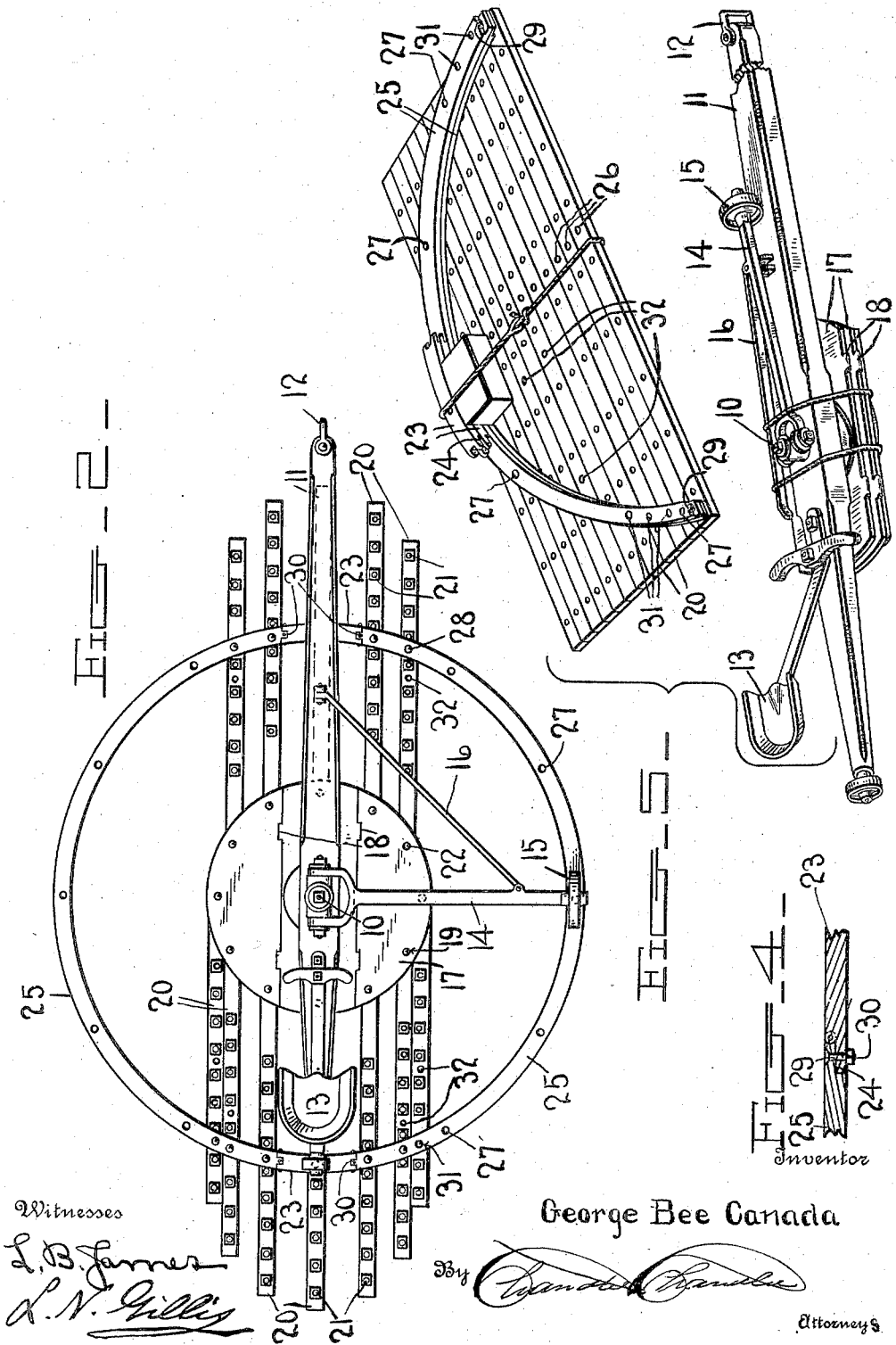
Witnesses
L. B. James
L. N. Gillis
Inventor
George Bee Canada
By [signature]
Attorneys

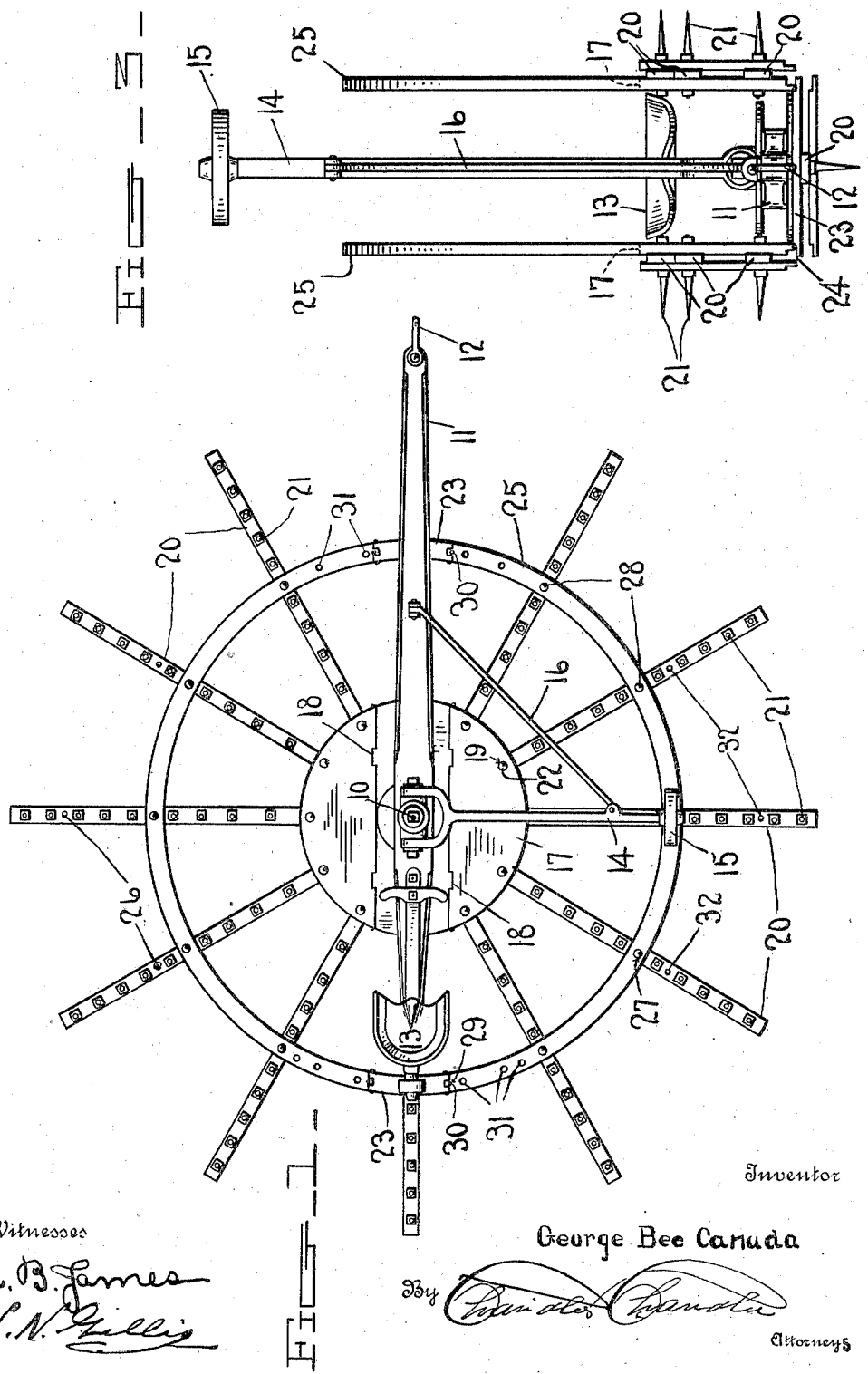

UNITED STATES PATENT OFFICE.

GEORGE BEE CANADA, OF HALLS, TENNESSEE.

HARROW.

965,686.  Specification of Letters Patent.  Patented July 26, 1910.

Application filed July 15, 1909. Serial No. 507,751.

*To all whom it may concern:*

Be it known that I, GEORGE BEE CANADA, a citizen of the United States, residing at Halls, in the county of Lauderdale, State of Tennessee, have invented certain new and useful Improvements in Harrows; and I do hereby declare the following to be a full, clear, and exact description of the invention, such as will enable others skilled in the art to which it appertains to make and use the same.

This invention relates to agricultural implements and has special reference to a form of rotary harrow.

One object of the invention is to provide a harrow of this character which is constructed in such a manner that it can be readily taken apart for shipment and which can be folded into a small space while being transported from one place to another.

With the above and other objects in view the invention consists in general of a center plate having bars radiating therefrom, a brace ring for said bars, said parts being of improved construction together with draft means for the harrow.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a top plan view of a harrow constructed in accordance with this invention. Fig. 2 is a similar view showing the parts ready for folding. Fig. 3 is a side elevation showing the parts folded. Fig. 4 is a detail view showing the manner of holding the ring in extended or operative position, the same being a section through one of the joints. Fig. 5 shows the parts packed for shipment.

The numeral 10 indicates the center pin of the harrow and secured upon this center pin is a tongue 11 provided at its forward end with a clevis 12 to which draft animals may be attached. Upon this beam behind the center pin is mounted a seat 13 suitably positioned for the driver.

Pivoted to the center pin 10 so that it swings in a vertical plane there is provided an arm 14 whereon is mounted a rolling weight 15 and this arm is connected at its free end to the tongue 11 by means of a suitable brace rod 16 which is hingedly connected to the tongue.

At 17 is a center plate which is held upon the pin 10 and this center plate comprises a central strip and outside wings of segmental form. The center strip and wings are connected by means of suitable hinges 18. This center plate 17 is provided with a series of spaced peripheral bolt receiving openings 19 and these bolt receiving openings are so arranged that there is one at each end of the center strip while the remainder of the openings are evenly spaced around the edge of the center plate.

At 20 are indicated the bars of a harrow and these bars are provided with suitable teeth 21 of any desired form. Each of these bars is further provided with a bolt receiving opening adjacent one end thereof and through these openings pass bolts 22 which serve to pivotally connect the bars and the center plate. In order to hold these bars in proper spaced relation as well as to provide a track for the rolling weight the bars at each end of the center strip, preferably called the center bars, have each secured thereto a plate 23 formed in the arc of a circle and this plate has at each end a rabbeted portion 24. These arcuate bars are continued to complete the circle by means of other bars 25 which have rabbeted ends fitting the rabbets 24 and these rabbeted ends are hingedly connected to the plates 23. In order to hold the ring in position on the bars when the same are in operative position, each of the bars is provided with a bolt hole 26 adapted to register with a bolt hole 27 formed in the ring and so arranged that when the device is in operative position each of these bolt holes 27 will be in radial alinement with its respective bolt hole in the center plate. Countersunk head bolts 28 are provided which pass through the bolt holes 26 and 27 and serve to hold the bars radially extended. In order to hold the ring in the same plane and prevent its folding up during the operation the rabbeted ends of the ring sections are provided with opposed bolt holes 29 which receive bolts 30 thus making the ring a rigid one when the bolts 30 are in position. In order to provide for positioning the bars in a parallel manner so that they can be readily folded the ring is provided with another series of bolt holes 31 and these last mentioned bolt holes are arranged to register with bolt holes 32 in the bars. These bolt holes 31 are furthermore so positioned on the ring that lines drawn through the centers of each of the series and its respective bolt hole in the center plate will be parallel.

By referring to Fig. 2 of the drawings it will be observed that the device is so arranged that when ready for folding up the bars are released from the ring and swung around on their pivots until they register with the last mentioned series of bolt holes when they are secured to the movable sections of the ring by their bolts. The bolts are then removed from the rabbeted bolt holes of the ring and the tongue 11 swung around until it lies over the center bars when the sides of the ring may be folded by carrying with them the weight 15. Furthermore, by reason of this construction all of the parts are readily detachable each from each so that in shipping the various members which go to make up the structure can be arranged in an extremely compact manner thus taking up but little space.

There has thus been provided a simple and efficient device of the kind described and for the purpose specified.

Having thus described the invention, what is claimed as new, is:—

1. In a harrow, a sectional center plate having its sections hingedly connected, a series of bars pivoted thereto, a sectional bracing ring having its sections hingedly connected, and means to attach the bars to the ring in selective positions.

2. In a harrow, a sectional center plate having its sections hingedly connected, a series of bars pivoted thereto, a sectional bracing ring having its sections hingedly connected, means to hold said sections extended, and other means to attach the bars to the ring in selective positions.

3. In a harrow, a sectional center plate having its sections hingedly connected, said center plate being provided with a series of bolt holes around the periphery thereof, a series of bars provided each with a bolt hole at one end thereof, said bars being further provided with other bolt holes intermediate their ends, bolts passing through the end holes and the bolt holes in the center plate, a sectional bracing ring having the ends of the abutting sections rabbeted and provided with bolt holes, hinges connecting said sections, said bracing ring being further provided with a series of spaced bolt holes in radial position relative to the holes in the center plate, said ring being further provided with a second series of spaced bolt holes in parallel alinement with the holes in the center plate, and bolts adapted to pass through the holes in the bars and ring to hold the bars in radial or parallel disposition and the ring in extended positions.

In testimony whereof, I affix my signature, in presence of two witnesses.

GEORGE BEE CANADA.

Witnesses:
    D. D. McDearman,
    D. H. Cherry.